United States Patent [19]

Truglio et al.

[11] Patent Number: 5,662,389

[45] Date of Patent: Sep. 2, 1997

[54] VARIABLE LOAD EP BRAKE CONTROL SYSTEM

[75] Inventors: James R. Truglio; Bryan M. McLaughlin, both of Watertown, N.Y.

[73] Assignee: New York Air Brake Corporation, Watertown, N.Y.

[21] Appl. No.: 709,816

[22] Filed: Sep. 10, 1996

[51] Int. Cl.⁶ .................................................. B60T 13/00
[52] U.S. Cl. ....................................................... 303/7; 303/20
[58] Field of Search ............................... 303/3, 7, 9.67, 303/9.68, 9.69, 15, 22.1, 20, 22.2, 22.6, 128, 132, 135, 134

[56] References Cited

U.S. PATENT DOCUMENTS

| | | |
|---|---|---|
| 3,285,674 | 11/1966 | Eaton . |
| 4,188,070 | 2/1980 | Grenier . |
| 4,344,138 | 8/1982 | Fraiser .................................. 303/20 X |
| 4,402,047 | 8/1983 | Newton et al. . |
| 4,421,360 | 12/1983 | Newton .................................. 303/22.6 |
| 4,624,506 | 11/1986 | Doto .................................... 303/20 X |
| 5,080,445 | 1/1992 | Brearley et al. . |
| 5,211,450 | 5/1993 | Gayfer et al. . |
| 5,405,182 | 4/1995 | Ewe et al. . |
| 5,551,765 | 9/1996 | Sich ............................................ 303/7 |

Primary Examiner—Josie Ballato
Attorney, Agent, or Firm—Barnes & Thornburg

[57] ABSTRACT

A method of controlling brakes of a car having electropneumatic brake valves, by determining the weight of the car and calculating the ratio of brake cylinder pressure to train brake command for the car using the weight of the car. Brake cylinder pressure is then determined using the brake train command and the calculated ratio and the brake cylinder pressure is controlled to the determined brake cylinder pressure. The ratio of the brake cylinder to pressure train brake command is calculated by first calculating a full service brake cylinder pressure for the pneumatic car and preferably using a fixed braking ratio. The rate of change of the brake cylinder pressure is also determined as a function of the weight.

30 Claims, 9 Drawing Sheets

VARIABLE LOAD EP BRAKE CONTROL SYSTEM

BACKGROUND AND SUMMARY OF THE INVENTION

The present invention relates generally to an electropneumatic brake control systems and more specifically to a variable load electropneumatic braking system.

In rail vehicles, the modification of the brake cylinder pressure as a function of the load is well known. This is true in transit as well as freight systems. To achieve the variable load modification, a pneumatic relay valve is provided between the brake control valve and the brake cylinder to modify the signal as a function of the sensed weight. The weight is sensed by the deflection of the springs on the vehicle either mechanically or pneumatically. Continuous variation of the brake signals by changing the area of a balanced piston or diaphragm is illustrated in U.S. Pat. No. 3,285,674 to Eaton. Another example is a variable lever illustrated in U.S. Pat. No. 4,421,360 to Newton.

In freight trains which include substantially more cars in the consist sometime exceeding 100 and extending for over a mile, the load response element of the braking device is known as an empty/load valve. This is a valve which is a qualitative valve which provides either 100% of the brake signal to the brake cylinder or only a fixed percentage thereof. For lighter cars, it provides the smaller percentage of the value. The type of empty/load valve is represented by the percentage of reduction and generally are known as EL/45, EL/50 or EL/60 representing a 45%, 50% and 60% reduction in brake cylinder pressure. Historically, a car that is 20% loaded considered an empty car. An example is illustrated in U.S. Pat. No. 5,211,450 to Gayfer et al.

These conventional empty/load devices obtain an adequately high loaded braking ratio, that provides satisfactory stopping ability and speed control in heavy cars, without having an empty braking ratio which is too high. Thus, loaded cars brake at a higher brake ratio than do empty cars. The purpose of the empty/load device is to eliminate in-train forces that are caused by braking differently loaded cars with the same brake force. In-train forces are also created by braking cars at different times. Although the ultimate goal of electropneumatic braking is to allow braking in all the cars simultaneously, the rate of brake cylinder pressure buildup and the reaching of the maximum braking pressure for each brake cylinder may still vary across the train creating in-train forces.

In addition to trains having loaded and empty cars, the trains may have mixed equipment. Some may have empty/load equipment and others may not. Some may have pneumatic brake control valves and other have electropneumatic brake control valves. In addition to weight, each of the individual cars may have different brake cylinder areas, lever ratios and because of their equipment or age, different braking deficiencies. All of these will change their braking response to a requested braking signal. With the availability of more information and controls on the individual cars on a freight train, there is a desirability to customize the braking response of the individual cars.

The response of conventional equipment with a 50% empty/load valve at a full load brake cylinder pressure of 64 PSI for 6.5% and a 10% gross rail load brake ratio defined at 50 PSI are illustrated in FIG. 1. As can be seen, the braking ratio varies with the weight of the car. Thus, the stopping distance of the train will change depending upon the weight of the individual cars in the consist, if they will each have a different braking ratio.

Thus, it is an object of the present invention to provide a method of braking which allows more consistent stopping distances among trains.

Another object of the present invention is to provide a method wherein a car can make an independent decision on the amount of braking to be made in response to a desired brake command.

An even further object of the present invention is to provide a braking method which is capable of a uniform braking ratio irrespective of the weight of the car.

A still even further object of the present invention is to provide a method of braking individual cars in the train which monitor changing variables which affect appropriate braking responses.

These and other objects are achieved by controlling brakes of a car having electropneumatic brake valves, by determining the weight of the car and calculating the ratio of brake cylinder pressure to train brake command for the car using the weight of the car. Brake cylinder pressure is then determined using the brake train command and the calculated ratio and the brake cylinder pressure is controlled to the determined brake cylinder pressure. The ratio of the brake cylinder to pressure train brake command is calculated by first calculating a full service brake cylinder pressure for the pneumatic car and preferably using a fixed braking ratio. The calculated ratio is used for brake command signals between a first and second value.

A minimum brake cylinder pressure is used for train brake commands between zero and the first value and a maximum brake cylinder pressure is used for train brake commands greater than the second value. The minimum brake cylinder pressure is a fixed value for all determined weights. The maximum brake cylinder pressure is a fixed percentage of a full service brake cylinder pressure for the train brake commands greater than the second Value. The same valves are used to apply and graduated release brake cylinder pressure over the full range of brake command signals. For direct release, the release pressure is a single ratio pressure over the full range of brake commands. A minimum ratio is selected for weights below a minimum weight. If weight cannot be determined, the determined weight is considered to be a fully loaded weight.

The rate of change of brake cylinder pressure is determined using the determined weight and the brake cylinder pressure is controlled at the determined rate of change. The rate of change of brake cylinder pressure is determined so that the determined brake cylinder pressure is reached at a predetermined time for initiation for a given train brake command. The predetermined time is selected so that the determined brake cylinder pressure is reached substantial simultaneously on all cars on the train having an electropneumatic brake valve. Alternatively, the select time can be determined such that the determined brake cylinder pressure is reached at a time after initiation for a given train brake command that would be reached by the car if the car had a pneumatic brake control valve. This allows it to mimic a pneumatic brake control valve in a mixed train.

The braking efficiency of the car is determined and used in calculating the fixed brake ratio. The ratio is recalculated for changes in weight and for changes in determined brake efficiency.

The process further includes determining if a load responsive braking modification device is on the car and compensating the determined brake cylinder pressure for braking modification reduced by the modification device. Preferably, the type of load responsive brake modification device is determined so that the type of modification can be calculated.

Other objects, advantages and novel features of the present invention will become apparent from the following detailed description of the invention when considered in conjunction with the accompanying drawings.

DETAILED DESCRIPTION OF THE PREFERRED EMBODIMENTS

The braking ability of rail cars and locomotives for comparison purposes uses the term "braking ratio". The braking ratio is the ratio of total force on all brake shoes to the weight of the vehicle. For comparison purposes, a particular brake cylinder pressure, for example, 50 PSI for freight cars is used. The formula for determining the net braking ratio is as follows:

$$NBR = \frac{(BCP)(C)}{W}$$

where:

BCP=Brake cylinder pressure
W=Car Weight (lbs)
NBR=Net Braking Ratio/100%
C=(Ac)(LR)(Nc)(E)

Ac=Brake cylinder area (sq. in.)
LR=Lever ratio
Nc=Number of brake cylinders
E=Efficiency/100%

The efficiency E of the brake riggings is deduced from results of stop distance tests where brake shoe friction is known or can be closely approximated from the results of dynameter tests. The efficiency E includes a rigging efficiency as well as brake shoe friction factors. The efficiency E is well known and is provided by the manufacturer of the brake shoes and riggings.

Figure 1:
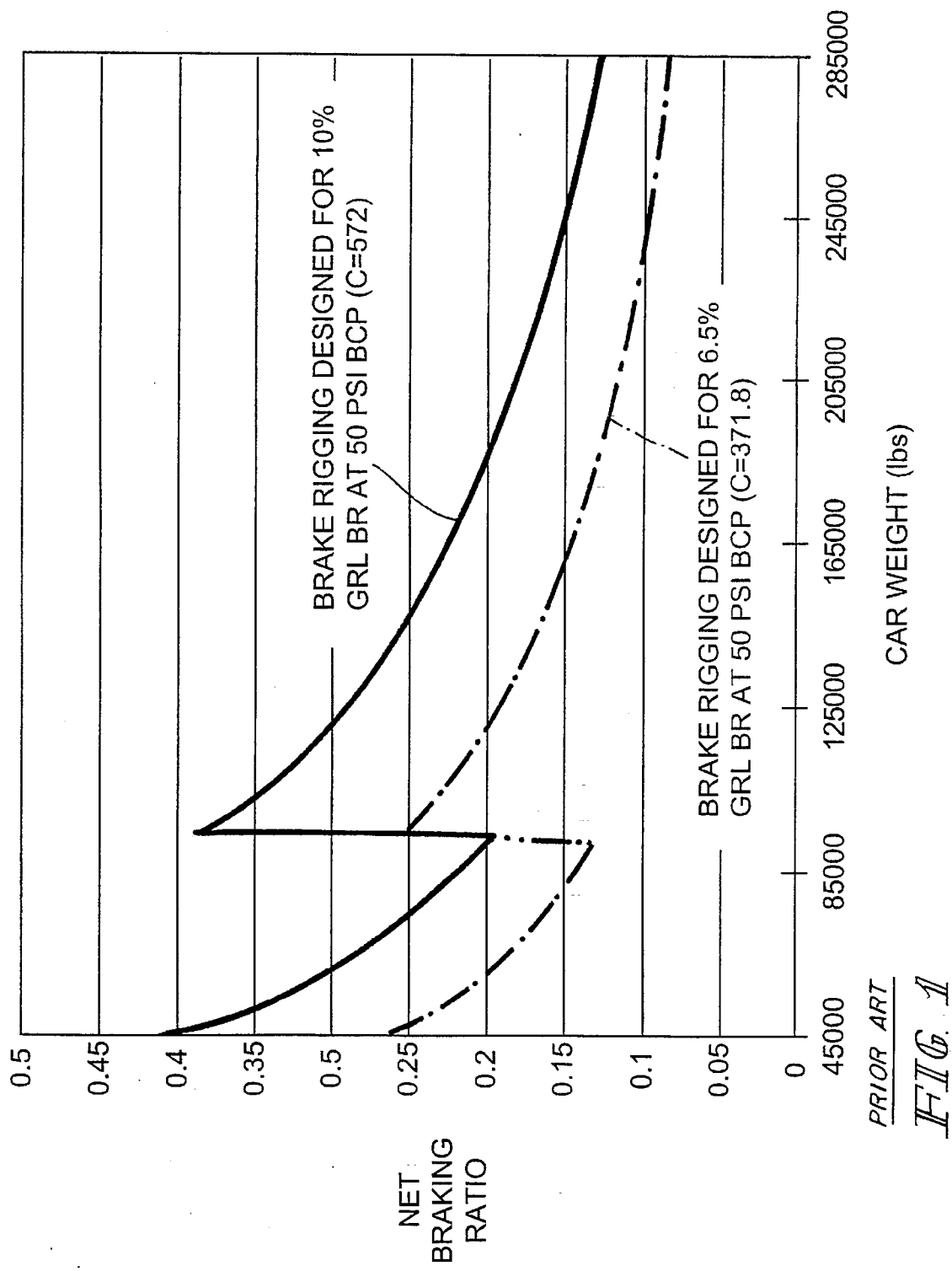
FIG. 1 are graphs of braking ratio versus car weight for a conventional prior art equipment having an empty/load device.

An example of the variation of the braking ratio versus car weight using a full load brake cylinder pressure of 64 PSI in combination with a 50% empty load valve defined at a brake cylinder pressure of 50 PSI is illustrated in FIG. 1. The upper curve shows a brake rigging design for a 10% gross rail load net braking ratio wherein the consist C=572 and the lower curve is for brake rigging designed for 6.5% gross rail load net braking ratio having a consist C=371.8. The initial portion of the curve is for empty cars at 50% of requested brake cylinder pressure and the remainder of the curve is for a loaded car at 100% of requested brake cylinder pressure. One can see from these curves that by holding the brake cylinder pressure BCP constant that the net braking ratio NBR varies with weight even without an empty/load device. Thus, various cars in the train would have different net braking ratios NBR depending upon their individual weight. While accommodating the applied brake pressure as a function of weight, it does not optimize the reduction of in-train forces. Also, the build up rate or the application rate of the brake cylinder pressure is generally uniform irrespective of the ultimate brake cylinder pressure. Thus, different cars will reach their fully braked condition at different times within the consist. This also does not reduce in-train forces.

Figure 2:
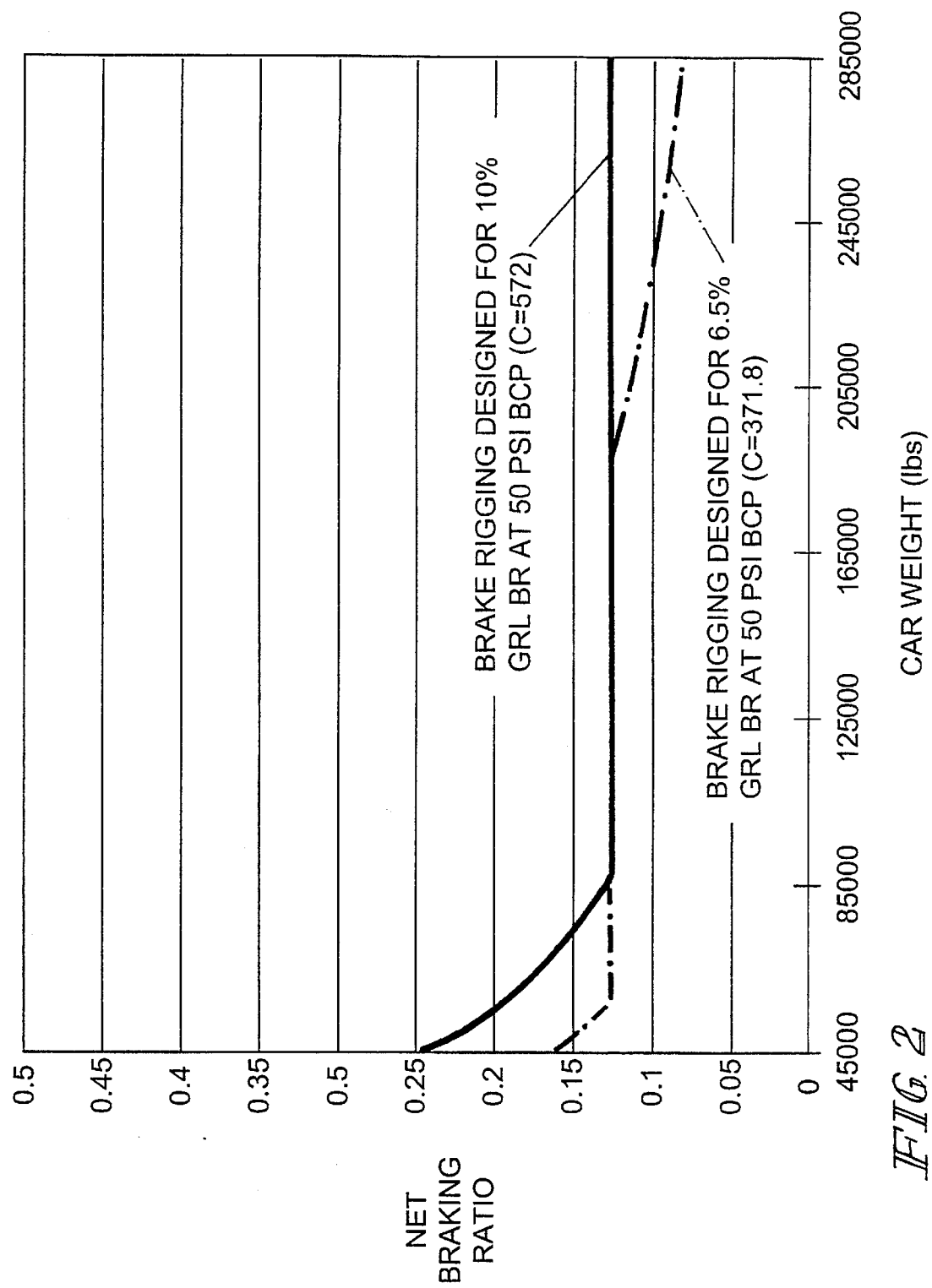
FIG. 2 are graphs of braking ratio versus car weight incorporating the principles of the present invention.

The present invention proposes controlling the brake cylinder pressure using a flat braking ratio. As illustrated in FIG. 2, a fixed braking ratio of 12.8% is selected with a full service brake cylinder pressure limited at 64 PSI maximum and having a minimum brake cylinder pressure of 20 PSI. Two curves are shown a brake rigging designs for the 10% gross rail load net braking ratio having C=572 and for a 6.5% gross rail load net braking ratio illustrated having C=371.8 defined at 50 PSI brake cylinder pressure. The minimum full service pressure 20 PSI causes a change in the braking ratio at the minimum levels up to a first value and then is flat or fixed to a second or maximum value of 64 PSI. The 10% rigging does not reach the maximum within the car weight whereas the 6.5% rigging maxes out between 185,000 to 205,000 pounds. Thus, its braking ratio decreases above its maximum value.

The 64 PSI full service pressure is for a 90 PSI brake pipe pressure. If brake pipe pressure is increased, the full service pressure is increased and the sloped portion of the 6.5% curve at the higher loads will decrease.

By maintaining a uniform brake ratio regardless of weight, each of the cars will more uniformly brake and provide more consistent stopping distances for a train. Thus, trains with loaded, empty or mixed cars will be able to brake at the same ratio. Not only does it offer more consistent stopping distances, but improves train handling by eliminating in-train forces that are caused by braking differently loaded cars at different brake ratios.

Figure 3:
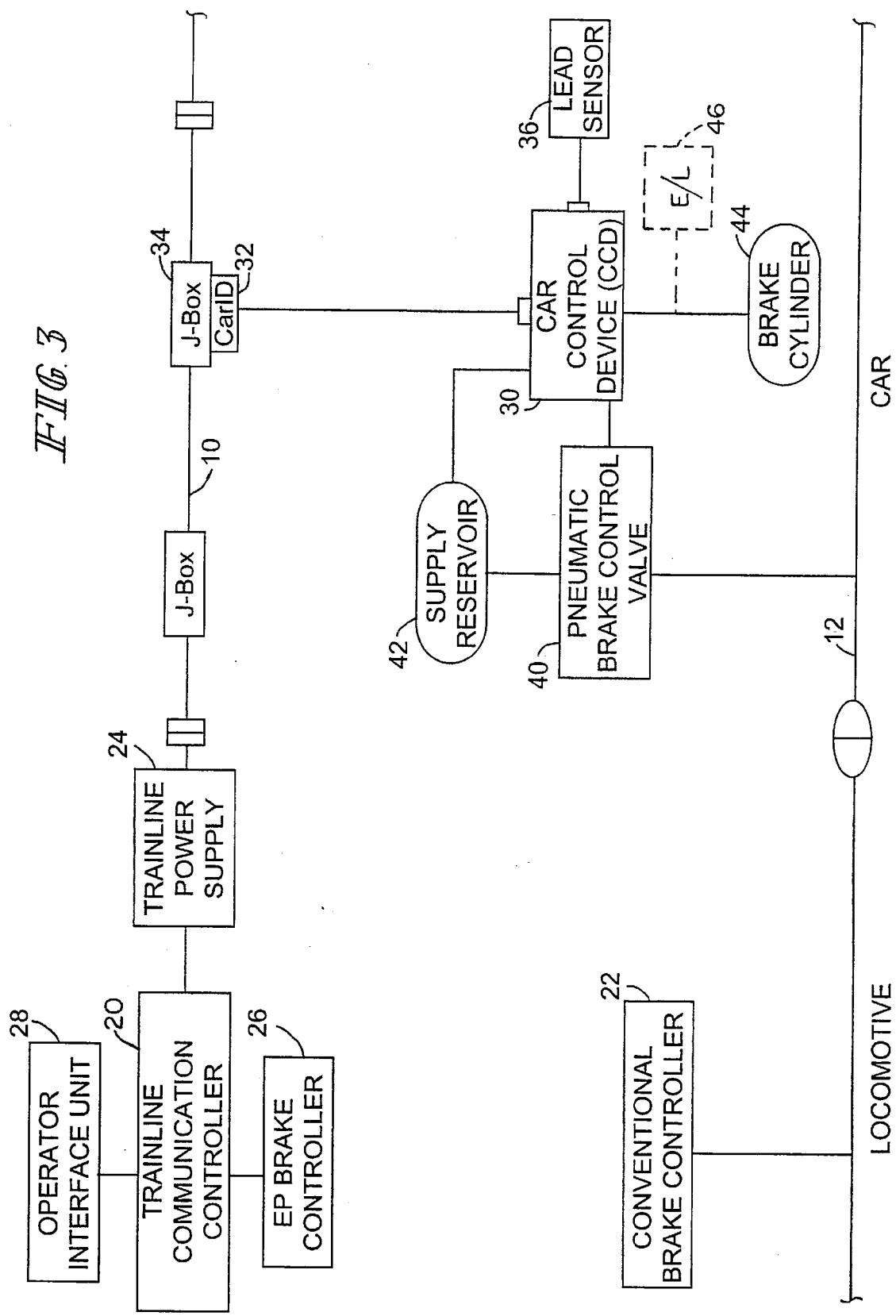
FIG. 3 is a block diagram representation of a train incorporating at least one car having electropneumatic brakes.

A train consists of one or more locomotives and a plurality of cars. FIG. 3 illustrates a single locomotive and a single car of a consist. An electropneumatic trainline 10 transmits power communication to the individual nodes of each of the cars. A brake pipe 12 provides pneumatic pressure to each of the cars to charge the reservoirs thereon and pressure fluctuations to apply and release the brakes pneumatically. The locomotive includes trainline communication controller 20, trainline power supply 24, EP brake controller 26 and an operator interface 28. The trainline communication controller 26 provides communication and power down the trainline 10 to the individual cars. Other communication media may be used. The conventional brake controller 22 is connected to the brake pipe 12.

A car having an electropneumatic brake includes a car control device 30 which includes electrical and electropneumatic elements connected to the trainline 10 through a car ID module 32 and a junction box 34. The car ID module 32 may be part of the car command control device 30. A load sensor 36 is connected to the car control device 30. Brake cylinder 44 is connected to the car control device 30 and receives pneumatic signals therefrom. The car control device 30 also receives pneumatic input signals from the pneumatic brake control valve 40 connected to the brake pipe 40 and supply reservoir 42. The car control device 30 can pneumatically or electrically operate the brake cylinder 44. An empty/load device 46 is shown in phantom which may be provided on the car. The train may include other cars with electropneumatic braking including the pneumatics and electric shown in FIG. 3 or may include merely the pneumatic portions 40–46.

The car control device 30 is capable of controlling the brake cylinder 44 for graduated brake application and release. The car control device 30 controls the brake cylinder pressure based on brake commands received from the train communication controller 20 on trainline 10, the desired net braking ratio, car load and other car braking parameters. The system is designed to provide uniform braking of the train regardless of the individual car loading. Both the service and emergency braking are electronically controlled.

The trainline communication controller 20 receives brake commands from the EP brake controller 26 and transmits them to each of the cars. The train brake commands TBC correspond to the following:

0%=Release
15%=Min-Service
16%–99%=Service
100%=Full-Service
120%=Emergency

The car control device 30 receives the brake command signal and is used to determine the brake cylinder pressure for the car based on car loading and other braking parameters.

The car control device 30 has a capability of automatically determining if an electronic load sensor 36 is installed on the car. If the sensor 36 is present, the car control device 30 reads the load sensor to determine the car weight and then adjusts the brake cylinder pressure accordingly. For cars with two or more trucks per car control device 30, the value of a single sensor is used to determine the car weight. For cars of several trucks per car control device 30, an average value of the sensors may be used to determine the car weight.

The trainline communication controller 20 may also include the car load information and can transmit it to the individual cars and their car control device 30. As part of the train start-up process, the empty or loaded status of the car can be entered in by the operator. In addition, the trainline controller 20 has a capability of receiving a train consist list with loading information for each car.

If a mechanical empty/load device 46 is installed on the car, the car control device 30 can be made aware of this and adjust brake cylinder pressure to compensate for it. The presence of a mechanical empty/load device 46 will be a parameter which is programmed into the car ID unit 32. The car ID unit 3 may also include the brake cylinder area, lever ratio, number of cylinders and braking efficiency of the brake rigging and shoes of the car. It should be noted that the car ID unit 32 is a permanent part of the car. Alternatively, the efficiency may be manually entered or compensated for age or other measurable variables of the wheels and rigging.

If the car load information is not available from a load sensor 36 or from the train communication controller 20, then 100% of the gross rail load (GRL) is used as the weight information.

Figure 4:
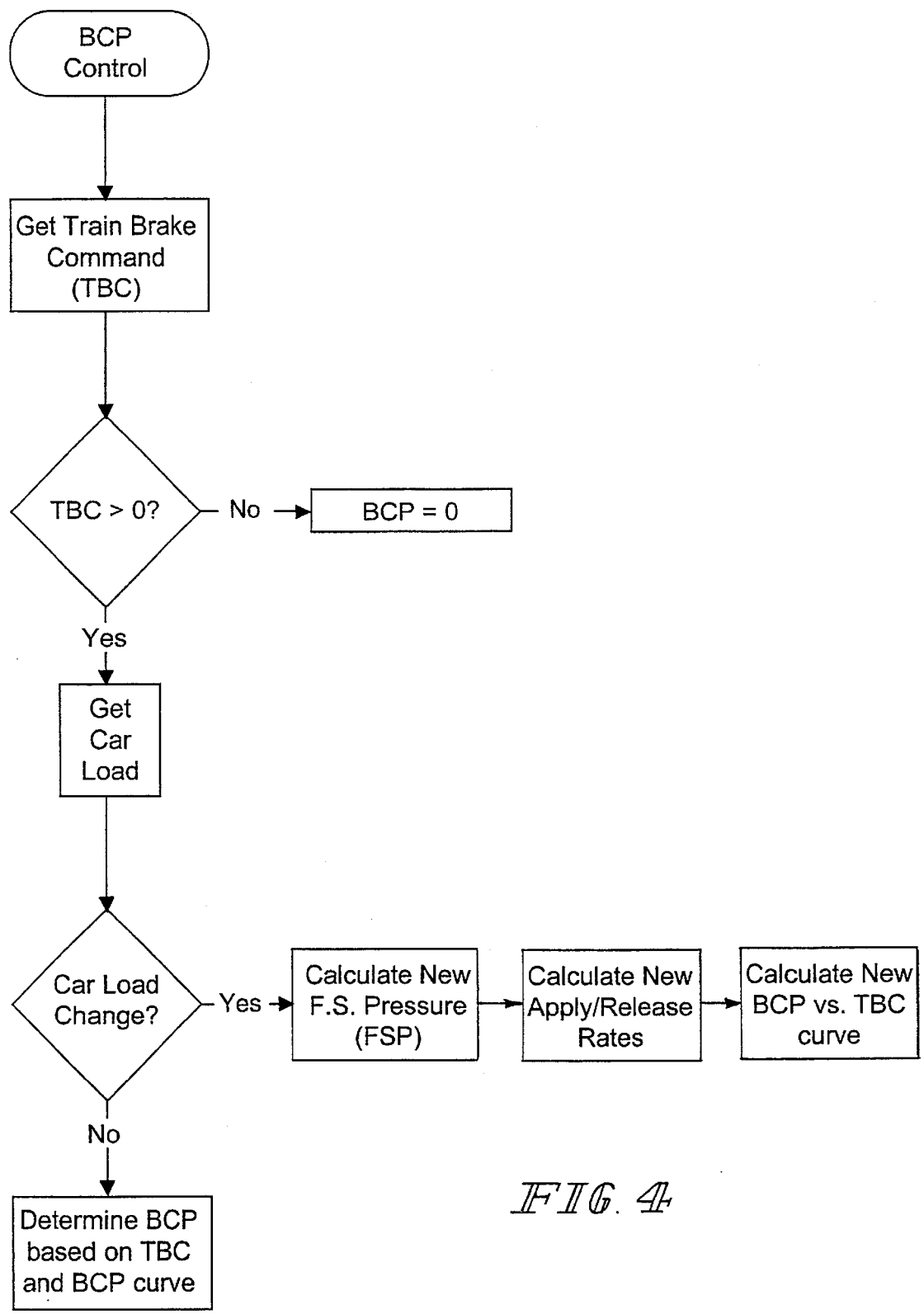
FIG. 4 is a flow chart for determining brake cylinder pressure according to the principles of the present invention.

The amount, apply rate and release rate or brake cylinder pressure is set and controlled by software in the car control device 30. A flow chart of the process of determining brake cylinder pressure is illustrated in FIG. 4. The car control device 30 obtains the train brake command TBC from the trainline communication controller 20. If the train brake command TBC is not greater than zero, then it sets the brake cylinder pressure BCP to zero. If it is greater than zero, then it obtains the car load W. As discussed, this value can either be measured from the load sensor 36 or previously sent and stored in the car control device 30. The car control device 30 then determines whether the load has changed. If this is the first time that the program is being run, the car load would have been changed.

The program determines a brake cylinder pressure BCP to train brake command ratio or curve. Preferably, this process begins, by calculating new full service pressure FSP. The system then calculates a new apply or release rate. Finally, the system calculates the new brake cylinder pressure versus train brake command curve. Once this curve is calculated, the computer determines the brake cylinder pressure based on the brake train command using the calculated curve. The full service pressure FSP is calculated from the following formula:

$$FSP = \frac{(W)(NBR)}{C}$$

The net brake ratio NBR is a known value selected for given train consists and is download from the trainline communication controller 20 during the train initialization process. The constant C which includes brake cylinder area, lever ratio, number of cylinders and efficiency of the rigging and wheels as well as empty and fully loaded weights for the particular car are known and are programmed into the car identification unit 32 and read by the car control device 30. As previously discussed, the car weight is determined based on load information received from the load sensor 36 or downloaded from the trainline communication controller 20 during initialization.

Full service pressure limits are programmed into the car controlled device. The examples used in the present application, the minimum full service pressure FSP min. is selected to be 20 PSI. The maximum full service pressure PSB max. is selected to be 65 PSI. The emergency pressure EMP is selected to be 120% of the full service pressure.

Depending upon the available memory in the car control device, the calculation of the ratio of brake cylinder pressure to train brake command and rate may be precalculated by the car control device or at the locomotive or even off the train and download or stored in the car control device 30. In such a case, the car control device 30 needs only to look up the brake cylinder pressure corresponding to the train brake command from the appropriate table.

The brake cylinder pressure curve for brake cylinder pressure BCP versus train brake command TBC is determined based on the minimum and calculated full service and an emergency, the pressure settings for giving the car weight. The following formulas were used to determine the curve.

| | |
|---|---|
| For $TBC = 0\%$ | $BCP = 0$ |
| For $0 < TBC <= 15\%$ | $BCP = $ Min Service Pressure |
| For $15 < TBC <= 100\%$ | $BCP = m(x) + b$ |
| | where $m = (FSP - MSP)/(100 - 15)$ |
| | $x = TBC$ |
| | $b = FSP - m(100)$ |
| For $TBC > 100\%$ | $BCP = 1.2 * FSP$ |

Figure 5:
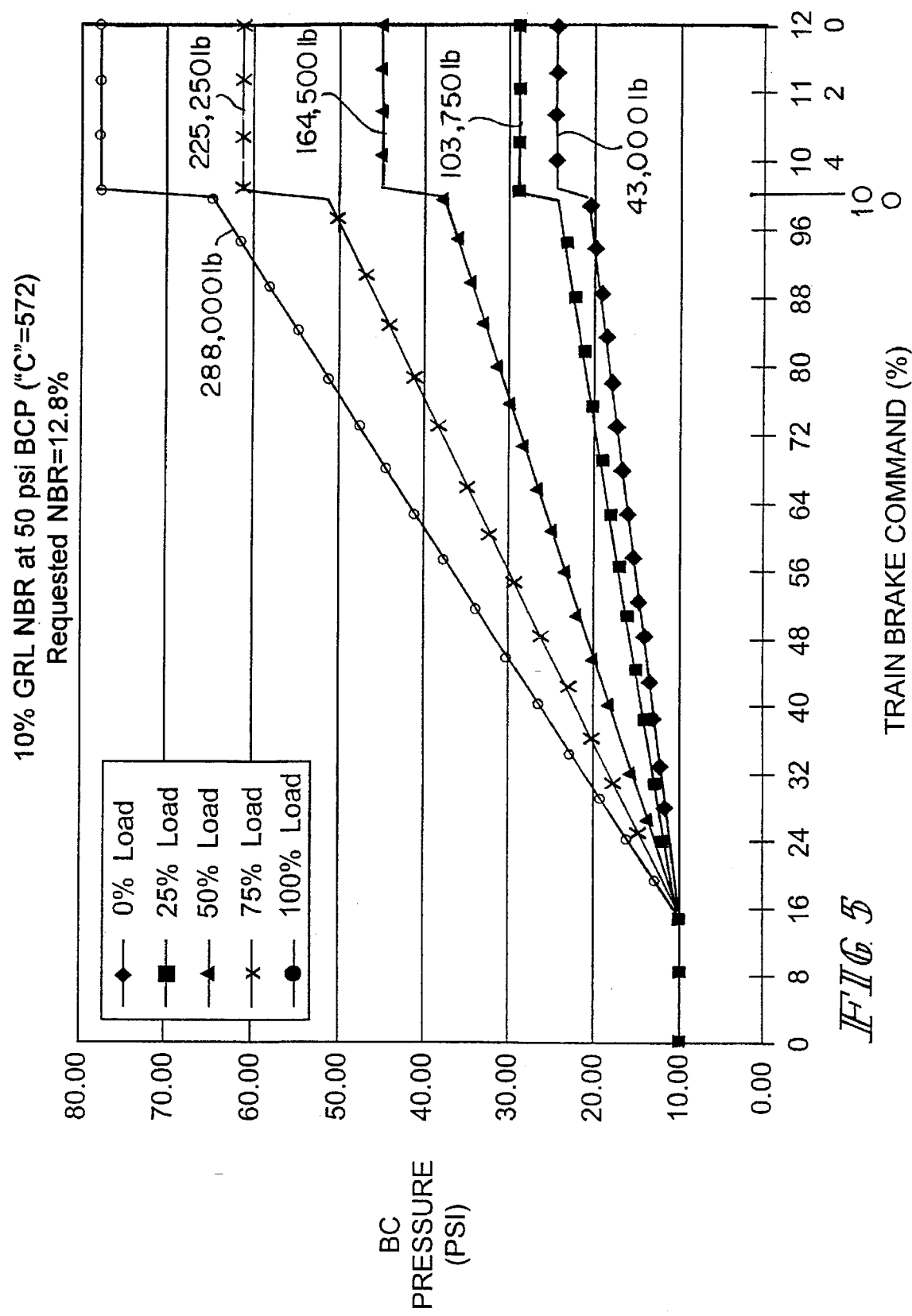
FIG. 5 are graphs of train brake command signal versus brake cylinder pressure of five different loads for a system designed for 10% gross rail load net braking ratio at 50 PSI and operated at 12.8% net braking ratio according to the present invention.
Figure 6:
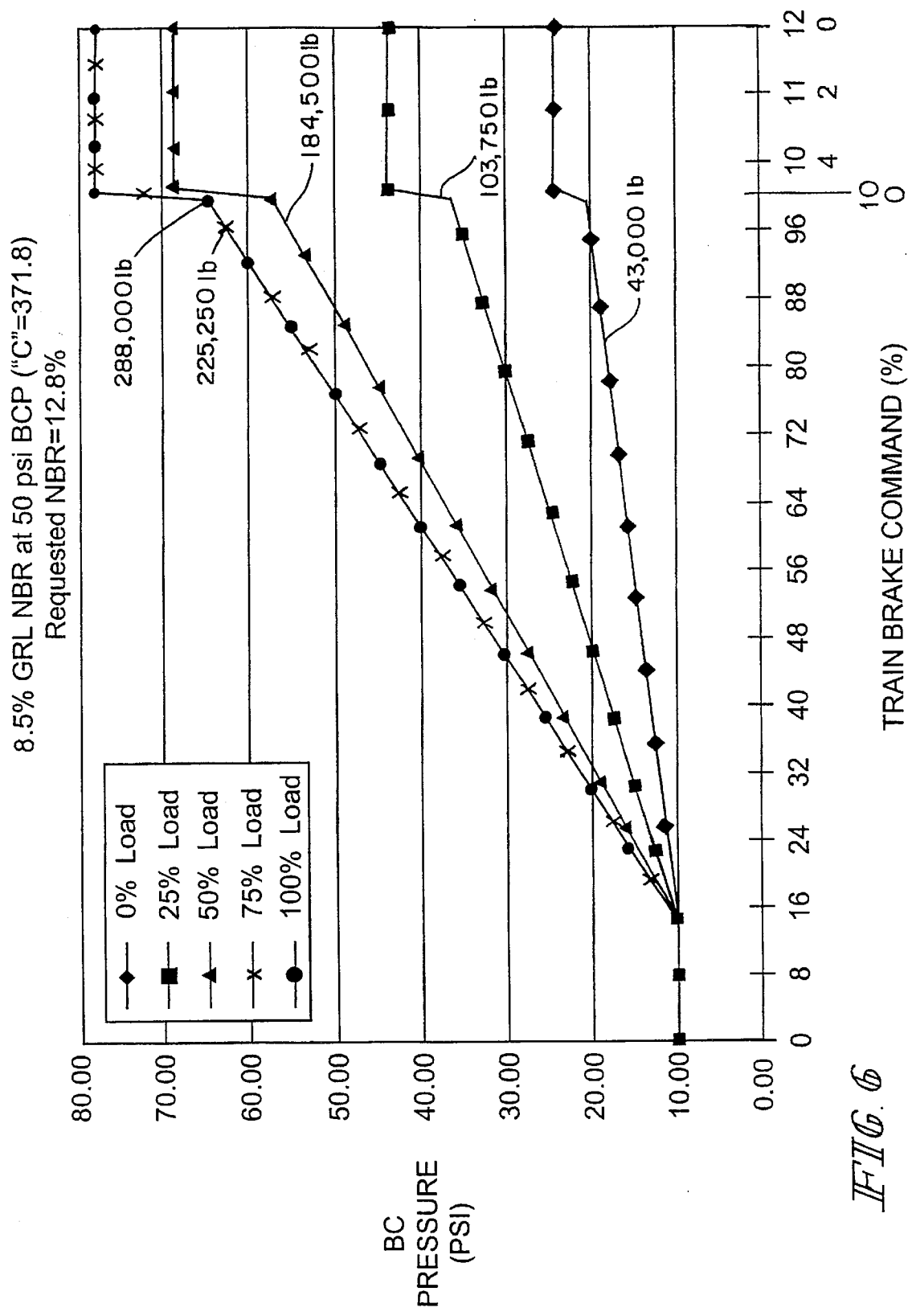
FIG. 6 are graphs of train brake command signals versus brake cylinder pressure of five loads for a system designed for 6.5% gross rail load net braking ratio at 50 PSI and operated at 12.8% net braking ratio according to the principles of the present invention.

The resulting curves of brake cylinder pressure BCP versus train brake command TBC for a fixed net braking ratio of 12.8% are illustrated in FIGS. 5 and 6 for five various loads. FIG. 5 uses a 10% gross rail load defined at a brake cylinder pressure of 50 PSI where C=572, whereas FIG. 6 is a 6.5% gross rail load defined at 50 PSI brake cylinder pressure where C=371.8. As will be noted from FIGS. 5 and 6, all of the curves include a minimum service application for brake cylinder pressure, of for example 10 pounds, up to a first value of train brake command of, for example, 15%.

The slope of the curves above 15% or the first value and up to a full service brake or second value, or 100% train brake command varies depending upon the weight of the car. As previously discussed, the minimum full service pressure is set for 20 PSI. Thus, the relationship of brake cylinder pressure to train brake command will never be less than the slope of the lowest curve shown for the zero percent load.

Above the 100% of full service pressure, a fixed value is used which is a fixed percentage of the full service pressure. This is selected to be 120% of full service pressure. This relationship is held constant for any brake train command above 100%.

It will be noted that while changing the constant C, it changes the slope of the curves in FIGS. 5 and 6 for the same percentage of load, from the minimum brake cylinder pressure or a first value to the full service or a second value. Above the second value, the brake cylinder pressure is set to another fixed value which is a function of the weight of the car.

The curves in FIGS. 5 and 6 are calculated for requested net braking ratio of 12.8% to produce the results illustrated in FIG. 2 wherein the braking ratio is fixed over a substantial range of car weights versus the continuously varying brake ratio with respect to car weights of FIG. 1 of prior art.

In addition to calculating the relationship of final brake cylinder pressure to train brake command, the rate of change of brake cylinder pressure is also determined. Preferably, the rate of change is selected such that all brake cylinders reach their maximum pressure at the same time irrespective of weight. Alternatively, if the electropneumatic brake is on a mixed train and it is desired that it emulates a pneumatic brake, the rate change is selected such that the determined brake cylinder pressure is reached at a time after initiation for a given train brake command that would be reached by the car if the car had a pneumatic brake control valve.

Figure 7:
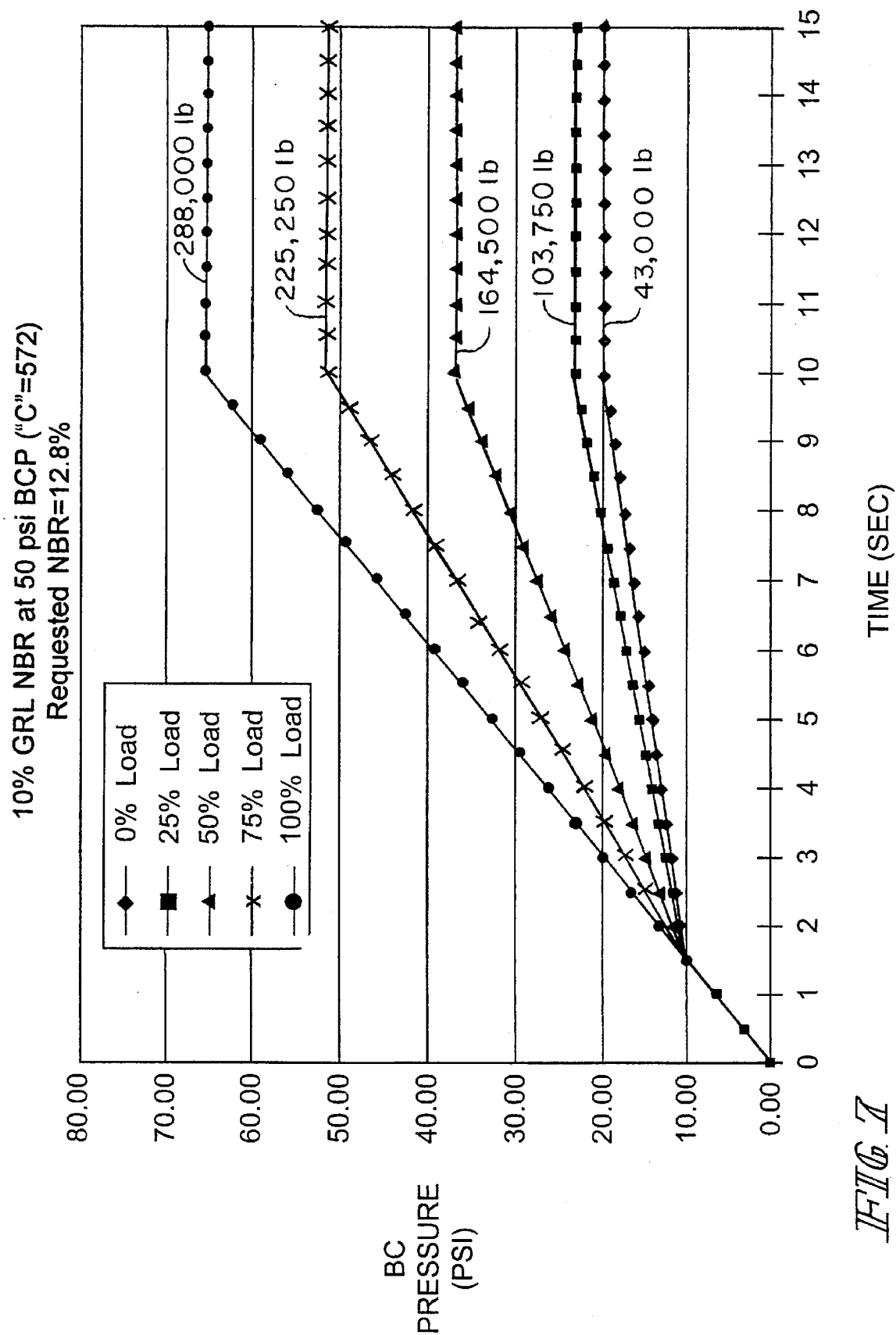
FIG. 7 are graphs of brake cylinder pressure versus time for a full service application of five loads for a system designed for 10% gross rail load net braking ratio at 50 PSI and operated at 12.8% net braking ratio according to the principles of the present invention.
Figure 8:
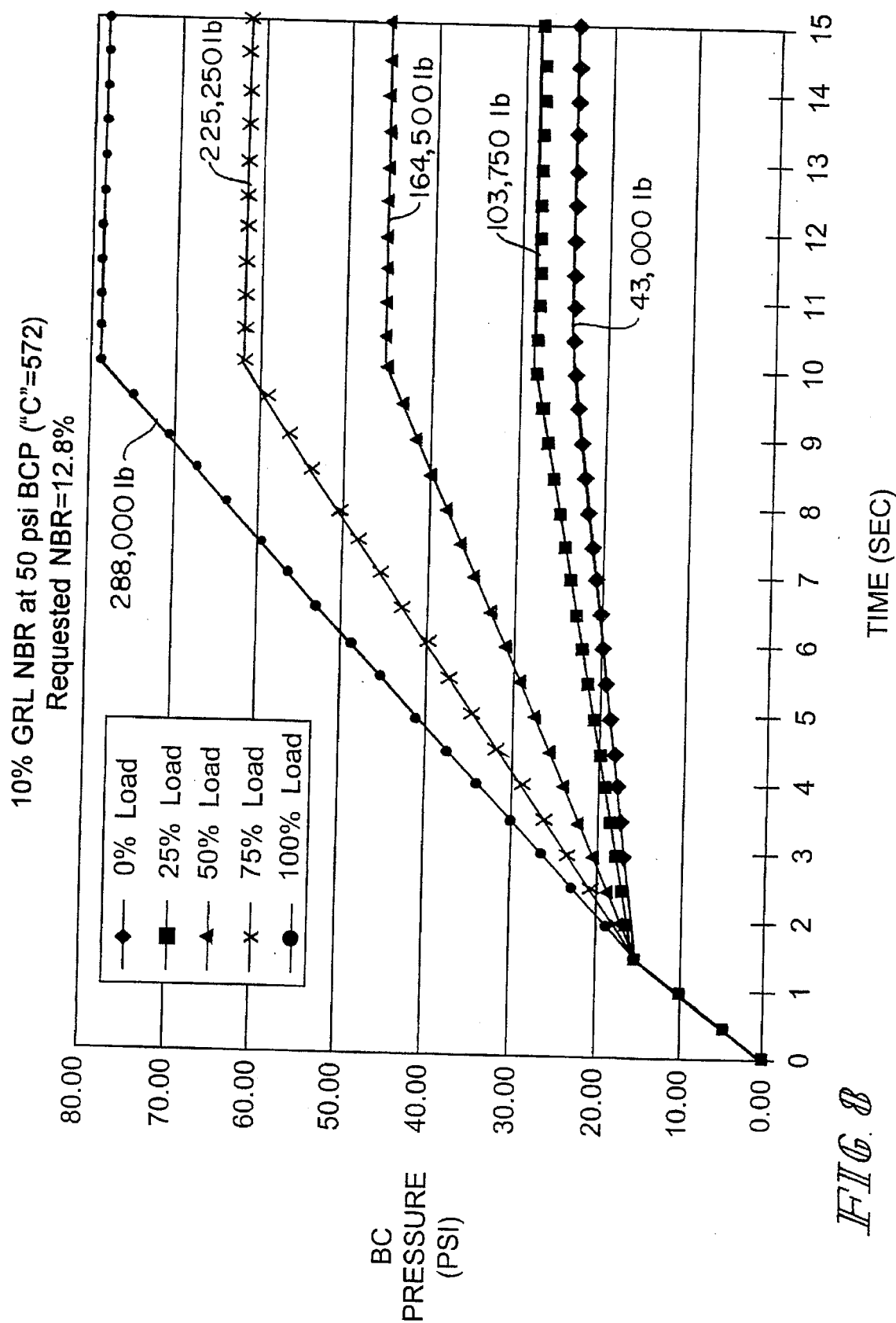
FIG. 8 are graphs of brake cylinder pressure versus time for an emergency application of five loads at system designed for 10% gross rail load net braking ratio at 50 PSI and operated at 12.8% net braking ratio according to the principles of the present invention.

FIGS. 7 and 8 show curves of brake cylinder pressure versus time for various loaded cars for full service and emergency applications respectfully. This is for a 10% gross rail load defined at 50 PSI brake cylinder pressure for a constant C=572 and a net braking ratio of 12.8%. These are the rates set for the curves in FIG. 5.

For the minimum brake cylinder pressure of 10 pounds for train brake commands below 15%, the rate of buildup for this service is fixed irrespective of weight. For example, the rate of change from zero to 10 PSI is selected to be 1.5 seconds. After the minimum brake cylinder pressure, the rate of buildup in brake cylinder pressure is a function of the weight of the car and the maximum full service pressure. The object is that irrespective of the weight of the car and consequently the determined brake cylinder pressure, all cars should reach its respective determined brake cylinder pressure for the train brake command at the same time. For example, all of the cars should reach their full service brake cylinder pressure, irrespective that value by 10 seconds after initiation. Using this criteria in FIG. 7, all of the brake cylinder pressures for a 50% train brake command would reach their values in 5½ seconds.

As illustrated in FIG. 8, the change of rate for the emergency application is substantially greater than that for the full service application. For an emergency application, the rate of change from zero to 15 PSI is 1.5 second irrespective of weight. After the first 1.5 seconds, the full emergency value should be reached in an additionally 8.5 or 10. seconds from initiation.

Figure 9:
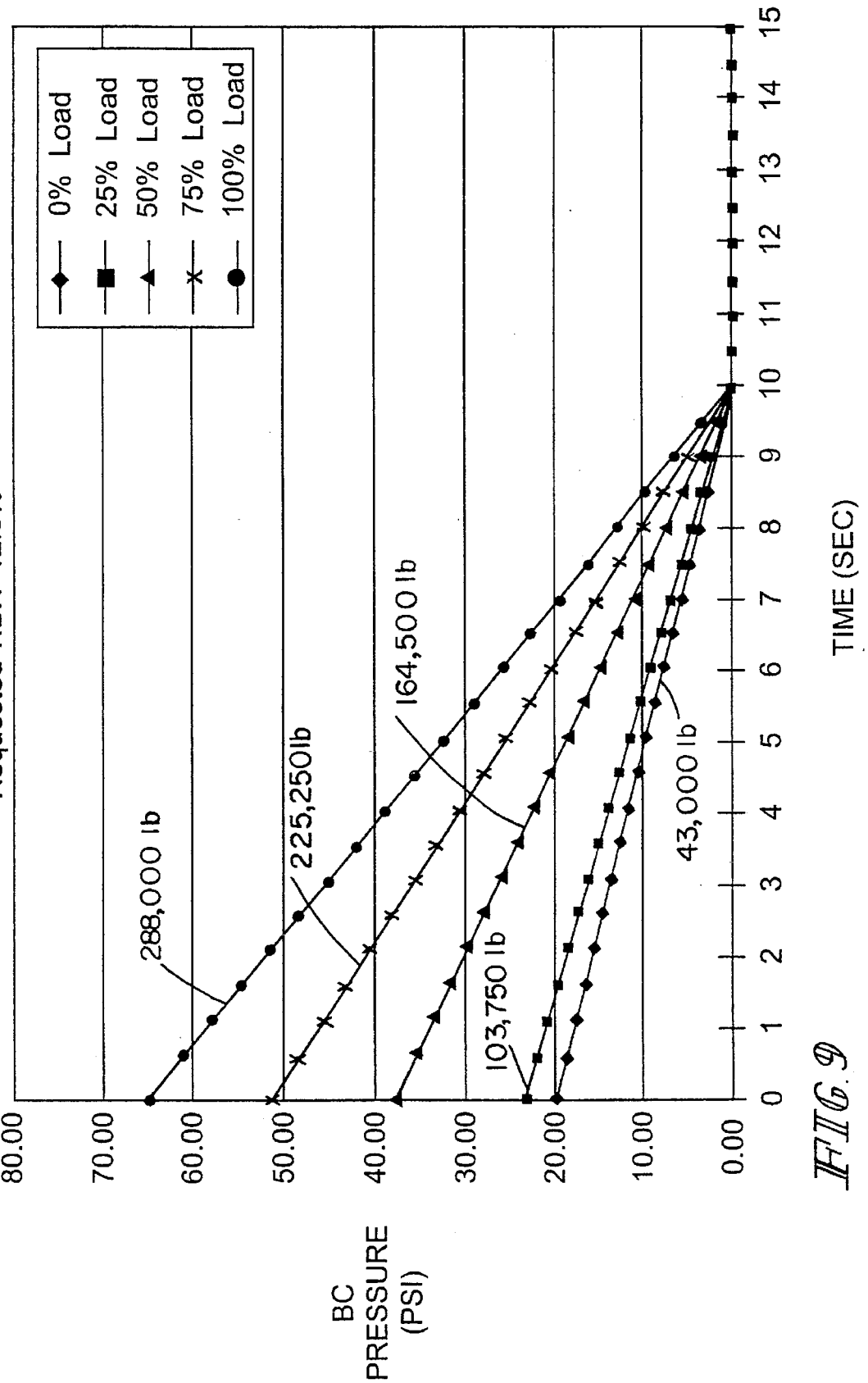
FIG. 9 are graphs of brake cylinder pressure versus time for direct release of five loads at system designed for 10% gross rail load net braking ratio at 50 PSI and operated at 12.8% net braking ratio according to the principles of the present invention.

The graduated release from service is the inverse of the curves as illustrated in FIG. 7, depending upon the weight of the vehicle. A direct release, from applied pressure directly to zero pressure, is a uniform rate of change as a function of weight and as illustrated in FIG. 9. The full service pressure release is from the full service to zero PSI in 10 seconds where the emergency pressure is set to reach zero in 12 seconds.

Although the present invention has been described and illustrated in detail for presently designed braking pipe maximum pressures and equipment, it is to be clearly understood that the same is by way of illustration and example only, and is not to be taken by way of limitation. The present invention is applicable to other net braking ratios and brake pipe maximum pressures. The spirit and scope of the present invention are to be limited only by the terms of the appended claims.

What is claimed:

1. A method of controlling the brakes on a car having an electropneumatic brake control valve in a train including at least one locomotive having a train brake controller and a plurality of cars having brake control valves and brake cylinders, the method comprising:

determining the weight of said car;

calculating a ratio of brake cylinder pressure to train brake command for said car using said determined weight;

determining brake cylinder pressure using a train brake command from said train brake controller and said calculated ratio; and controlling said brake cylinder pressure to said determined brake cylinder pressure.

2. A method according to claim 1, wherein calculating said ratio includes using a fixed braking ratio.

3. A method according to claim 2, wherein determining said brake cylinder pressure includes using said calculated ratio for train brake commands between a first and second value.

4. A method according to claim 3, wherein determining said brake cylinder pressure includes using a minimum brake cylinder pressure for train brake commands between zero and said first value.

5. A method according to claim 4, wherein determining said brake cylinder pressure includes using a maximum brake cylinder pressure for train brake commands greater than said second value.

6. A method according to claim 2, wherein controlling said brake cylinder pressure includes determining a rate of change of brake cylinder pressure using said determined weight and controlling the rate of change of brake cylinder pressure.

7. A method according to claim 2, including determining braking efficiency of said car and calculating said fixed brake ratio from said braking efficiency.

8. A method according to claim 7, wherein said ratio is recalculated for changes in determined weight and for changes in determined braking efficiency.

9. A method according to claim 1, wherein calculating said ratio includes calculating an apply ratio of brake cylinder pressure to train brake apply command; and determining said brake cylinder pressure includes using said calculated apply ratio for train brake apply commands between a first and a second value.

10. A method according to claim 9, wherein determining said brake cylinder pressure includes using a minimum brake cylinder pressure for train brake apply commands between zero and said first value.

11. A method according to claim 10, wherein said minimum brake cylinder pressure is a fixed value for all determined weights.

12. A method according to claim 10, wherein determining said brake cylinder pressure includes using a maximum brake cylinder pressure for train brake apply commands greater than said second value.

13. A method according to claim 10, wherein determining said brake cylinder pressure includes using said calculated apply ratio for train brake graduated release commands between zero and said second values and said minimum brake cylinder pressure between zero and said first valves.

14. A method according to claim 9, wherein determining said brake cylinder pressure includes using a maximum brake cylinder pressure, having a fixed percentage of a full service brake cylinder pressure, for train brake apply commands greater than said second value.

15. A method according to claim 9, wherein calculating said ratio includes calculating a direct release ratio of brake cylinder pressure to train brake release command; and determining said brake cylinder pressure includes using said calculated direct release ratio for train brake release commands between zero and said second value.

16. A method according to claim 1, wherein calculating said ratio includes selecting a minimum ratio for determined weights below a minimum weight.

17. A method according to claim 1, wherein controlling said brake cylinder pressure includes determining a rate of change of brake cylinder pressure using said determined weight and controlling the rate of change of brake cylinder pressure.

18. A method according to claim 17, wherein said determining a rate of change of brake cylinder pressure is determined so that said determined brake cylinder pressure is reached at a predetermined time after initiation for a given train brake command.

19. A method according to claim 18, including selecting said predetermined time so that said determined brake cylinder pressure is reached substantially simultaneously on all of the cars on the train having an electropneumatic brake control valve.

20. A method according to claim 18, including selecting said predetermined time so that said determined brake cylinder pressure is reached at a time after initiation for a given train brake command that would be reached by said car if said car had a pneumatic brake control valve.

21. A method according to claim 1, wherein said ratio is recalculated for changes in determined weight.

22. A method according to claim 1, wherein calculating said ratio includes calculating a full service brake cylinder pressure for said car using said determined weight and calculating said ratio using said calculated full service brake cylinder pressure.

23. A method according to claim 1, wherein determining the weight includes determining the weight to be fully loaded if actual weight cannot be determined.

24. A method according to claim 1, including determining if said car includes a load responsive braking modification device; and wherein determining brake cylinder pressure includes compensating said determined brake cylinder pressure for braking modification of said modification device.

25. A method according to claim 1, including determining if said car includes the type of a load responsive braking modification device; and wherein determining brake cylinder pressure includes compensating said determined brake cylinder pressure for braking modification of said type of said modification device.

26. A method of controlling the brakes on a car having an electropneumatic brake control valve in a train including at least one locomotive having a train brake controller and a plurality of cars having brake control valves and brake cylinders, the method comprising:

determining the weight of said car;
determining brake cylinder pressure and a rate of change of brake cylinder pressure using said determined weight and a train brake command from said train brake controller; and
controlling said brake cylinder pressure and the rate of change of brake cylinder pressure to said determined brake cylinder pressure and rate of change.

27. A method according to claim 26, wherein determining said rate of change of brake cylinder pressure is determined so that said determined brake cylinder pressure is reached at a predetermined time after initiation for a given train brake command.

28. A method according to claim 27, including selecting said predetermined time so that said determined brake cylinder pressure is reached substantially simultaneously on all of the cars on the train having an electropneumatic brake control valve.

29. A method according to claim 27, including selecting said predetermined time so that said determined brake cylinder pressure is reached at a time after initiation for a given train brake command that would be reached by said car if said car had a pneumatic brake control valve.

30. A method according to claim 26, wherein determining said brake cylinder pressure includes calculating a ratio of brake cylinder pressure to train brake command for said car using said determined weight.

* * * * *